United States Patent
Blischak et al.

(10) Patent No.: US 11,408,495 B2
(45) Date of Patent: Aug. 9, 2022

(54) COMPACT TORQUE CONVERTER ASSEMBLY FOR HYBRID MODULE

(71) Applicant: Schaeffler Technologies AG & Co. KG, Herzogenaurach (DE)

(72) Inventors: Melissa Blischak, Copley, OH (US); Patrick Lindemann, Wooster, OH (US); Steven Rhoads, Smithville, OH (US); Ayyalraju Satyaseelan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/183,729

(22) Filed: Feb. 24, 2021

(65) Prior Publication Data

US 2021/0270353 A1    Sep. 2, 2021

Related U.S. Application Data

(60) Provisional application No. 62/983,602, filed on Feb. 29, 2020.

(51) Int. Cl.
*F16H 45/02* (2006.01)
*B60K 6/48* (2007.10)
*B60K 6/387* (2007.10)
*F16H 45/00* (2006.01)
*F16H 41/24* (2006.01)

(52) U.S. Cl.
CPC ............ *F16H 45/02* (2013.01); *B60K 6/387* (2013.01); *F16H 41/24* (2013.01); *F16H 2045/002* (2013.01); *F16H 2045/0273* (2013.01); *F16H 2045/0284* (2013.01)

(58) Field of Classification Search
CPC .. F16H 41/24; F16H 45/00–2045/0294; F16D 21/00; B60K 6/387; B60K 17/00; B60K 6/48–485
See application file for complete search history.

(56) References Cited

U.S. PATENT DOCUMENTS

| | | | | |
|---|---|---|---|---|
| 6,217,476 | B1 * | 4/2001 | Muller | B60K 6/40 477/5 |
| 7,810,592 | B2 * | 10/2010 | Klemen | B60L 1/02 180/65.23 |
| 10,024,408 | B2 | 7/2018 | Johnson | |
| 10,352,422 | B2 | 7/2019 | Satyaseelan et al. | |
| 2004/0130225 | A1 * | 7/2004 | Mencher | B60K 6/485 310/78 |
| 2005/0133328 | A1 * | 6/2005 | Masuya | F16H 45/02 192/3.3 |
| 2006/0289209 | A1 * | 12/2006 | Grosspietsch | B60L 50/16 180/65.25 |
| 2008/0060859 | A1 * | 3/2008 | Klemen | B60L 50/16 903/906 |
| 2008/0072586 | A1 * | 3/2008 | Hammond | B60K 6/405 60/330 |
| 2008/0258585 | A1 * | 10/2008 | Kataoka | G01P 3/488 310/68 B |
| 2012/0025644 | A1 | 2/2012 | Ogawa et al. | |
| 2013/0310216 | A1 * | 11/2013 | Kamiya | B60L 50/16 477/5 |
| 2014/0144742 | A1 * | 5/2014 | Sperrfechter | B60K 6/26 192/3.29 |
| 2016/0105060 | A1 | 4/2016 | Lindemann et al. | |
| 2019/0308496 | A1 | 10/2019 | Reimnitz | |
| 2020/0039496 | A1 | 2/2020 | Lindemann et al. | |

FOREIGN PATENT DOCUMENTS

| | | |
|---|---|---|
| JP | 2003070207 A | 3/2003 |
| JP | 3791481 B2 | 6/2006 |
| KR | 101773350 B1 | 8/2017 |

* cited by examiner

*Primary Examiner* — David R Morris

(57) ABSTRACT

A hybrid module comprising a rotor assembly including a rotor carrier and a torque converter completely disposed radially inside of the rotor carrier is provided. The torque converter assembly includes an impeller having an impeller shell fixed to the rotor carrier such that the impeller shell and the rotor carrier form a housing of the torque converter.

20 Claims, 1 Drawing Sheet

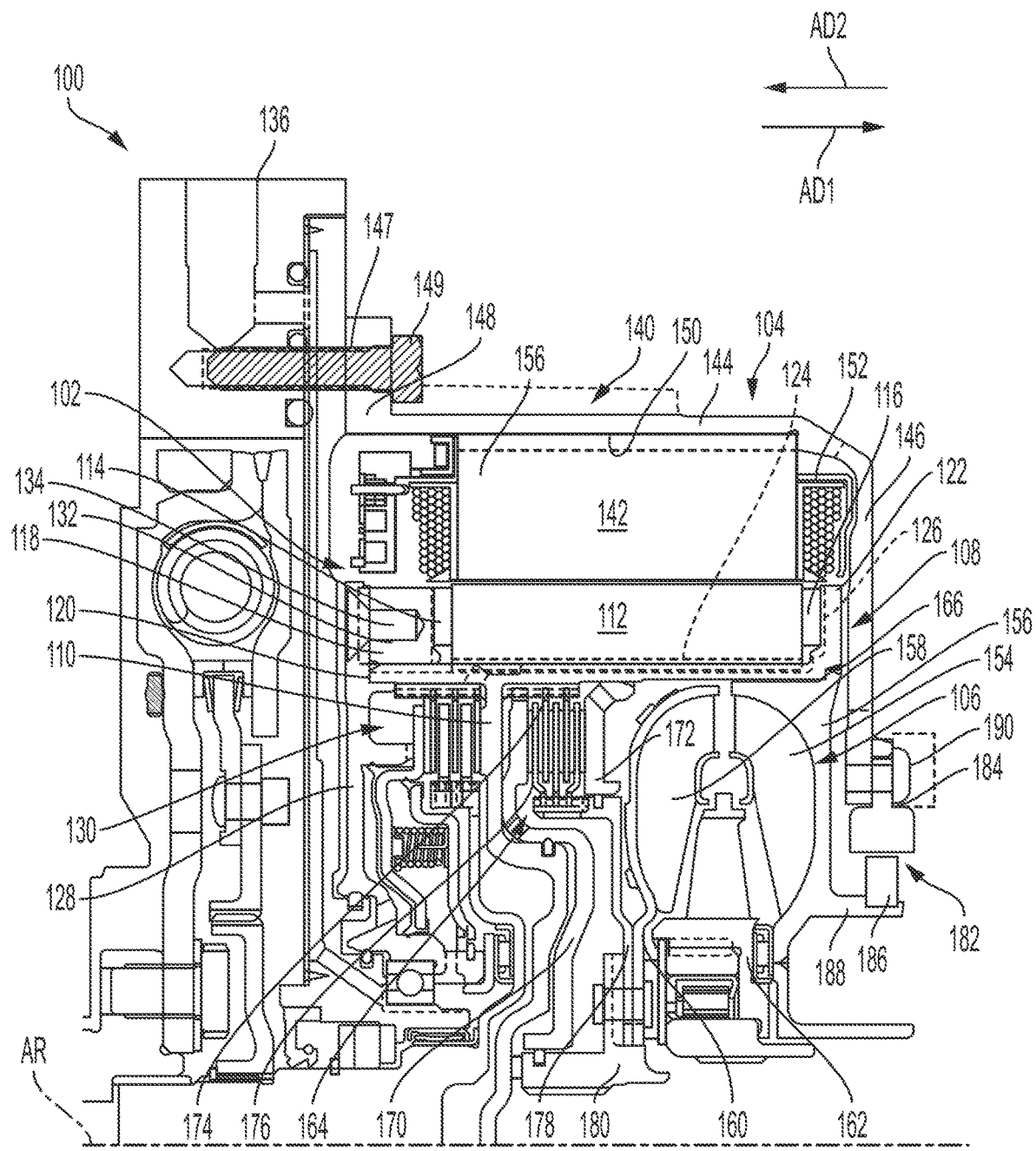

COMPACT TORQUE CONVERTER ASSEMBLY FOR HYBRID MODULE

CROSS-REFERENCE TO RELATED APPLICATIONS

This application claims priority to U.S. Provisional Application No. 62/983,602 filed Feb. 29, 2020, the entire disclosure of which is incorporated herein by reference.

TECHNICAL FIELD

The present disclosure relates generally to a hybrid module and, more specifically, to a torque converter assembly for a hybrid module.

BACKGROUND

Hybrid modules are generally known. Often, it is a challenge to package and/or fit all the desired components, e.g., an e-motor, crank damper, torque converter, torque converter clutch, disconnect clutch, and resolver within the hybrid module architecture due to axial constraints. It is therefore desirable to simplify designs to reduce complexity and costs.

SUMMARY

In general, embodiments of the present disclosure provide a hybrid module comprising a rotor assembly including a rotor carrier and a torque converter completely disposed radially inside of the rotor carrier. The torque converter includes an impeller having an impeller shell fixed to the rotor carrier such that the impeller shell and the rotor carrier form a housing of the torque converter. In embodiments, the rotor assembly includes a rotor flange attached to the rotor carrier and extending radially inward toward an axis of rotation that is configured to connect to an input shaft. A disconnect clutch may be disposed on a first axial side of the rotor flange and a lock-up clutch may be disposed on a second axial side of the rotor flange, wherein the disconnect clutch, the lock-up clutch, a turbine, and the impeller are disposed radially inside the rotor carrier. In embodiments, the disconnect clutch, the lock-up clutch, the turbine, and the impeller together extend a first axial length equal to or less than a second axial length of the rotor carrier.

In embodiments, the rotor carrier includes an axially extending portion and a radially extending portion and the impeller shell is fixed to an inner end of the radially extending portion. The impeller shell may be fixed to the inner end of the radially extending portion of the rotor carrier via a welded connection. In embodiments, a flange is attached to the impeller shell and extends axially outward therefrom and a resolver assembly including a resolver rotor may be mounted on an outer surface of the flange. The resolver rotor may be press-fit on the outer surface of the flange and the flange extends axially beyond the rotor carrier.

In embodiments, a torque converter for a hybrid module comprises a torus including a turbine and an impeller having an impeller shell fixed to a rotor carrier, wherein the impeller shell and the rotor carrier form a housing of the torque converter. A lock-up clutch may be disposed within the housing and radially aligned with the torus. The lock-up clutch and the torus together may extend a first axial distance equal to or less than a second axial distance the rotor carrier extends such that the lock-up clutch and the torus are fully disposed radially inside the rotor carrier.

Embodiments of the present disclosure provide various advantages over the prior art such as providing a compact torque converter assembly for packaging in hybrid modules with limited space.

BRIEF DESCRIPTION OF THE DRAWINGS

The single FIGURE shows a partial cross-sectional view of a hybrid module according to an embodiment of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The single FIGURE illustrates a partial cross-sectional view of hybrid module 100 according to an embodiment of the present disclosure. Hybrid module 100 includes rotor assembly 102, stator assembly 104, and torque converter assembly 106. Rotor assembly 102 includes rotor carrier 108, rotor carrier hub or rotor flange 110, rotor segment 112, spring end plate 114, spring end plate 116, and end ring 118. Rotor carrier 108 includes axially extending portion 120 and radially extending portion 122. Axially extending portion 120 includes outer surface 124 and radially extending section 122 includes radial surface 126. Rotor carrier hub or flange 110 is fixed to axially extending portion 120 of rotor carrier 108 and extends radially inward toward axis of rotation AR, wherein rotor carrier hub or flange 110 is configured to connect with an input shaft. The terms axially, radially and circumferentially as used herein are used with respect to axis of rotation AR.

Rotor segment 112 is installed and arranged on outer surface 124 of axially extending portion 120 of rotor carrier 108. In one embodiment, rotor segment 112 may be comprised of a stack of segments. Spring end plates 114, 116 are assembled on opposite axial sides of rotor segment 112. End ring 118 is fixed to outer surface 124 of axially extending portion 120 of rotor carrier 108 adjacent to spring end plate 114 and is arranged to act as a grounding component for disconnect clutch cover 128 of disconnect clutch 130. In this way, spring end plate 114 is disposed axially between end ring 118 and rotor segment 112, and spring end plate 116 is disposed axially between rotor segment 112 and radial surface 126 of radially extending portion 122 of rotor carrier 108. End ring 118 is configured to compress spring end plates 114, 116 to clamp and/or secure rotor segment 112 to rotor carrier 108.

During assembly, spring end plate 114 and spring end plate 116 are mounted in an initial, uncompressed state. That is, spring end plates 114, 116 will have a tapered profile. End ring 118 is then assembled on rotor carrier 108 and then pressed down with load to compress both spring end plate 114 and spring end plate 116. That is, end ring 118 presses spring end plate 114, rotor segment 112, and spring end plate 116 against radial surface 126 of radially extending portion 122 of rotor carrier 108 to clamp rotor segment 112 to rotor carrier 108 for frictional torque transmission therebetween. End ring 118 is then welded to rotor carrier 108. In this way, the clamp load generated by the compressed spring end plates 114, 116 is routed between rotor carrier 108 and rotor segment 112 and thereby clamp rotor segment 112 to rotor carrier 108. Spring end plates 114, 116 are of a non-magnetic material or of low magnetic permeability to prevent the magnetic flux from shorting between rotor magnets. In one embodiment, spring end plates 114, 116 are made of a stainless-steel material. This, in turn, provides sufficient strength and ductility to generate the necessary clamp load to hold the rotor inertia due to engine vibrations. Higher clamp loads can be attained by thickening spring end plates 114, 116. Moreover, the stainless-steel grade also prevents the magnetic flux from the magnets from shorting to each other. In this way, spring end plates 114, 116 acts as a rotor clamping feature for fixing rotor segment 112 to rotor carrier 108, as well as preventing magnets in the rotor from shorting the magnetic flux.

End ring 118 further includes threaded opening 132 defined therein for receiving one or more bolts 134 to connect disconnect clutch cover 128 to end ring 118. In this way, the full length of end ring 118 can be used to strengthen the bolting connection on account of that taking up the axial load of reacting the disconnect clutch 130 apply. Threaded opening 132 of end ring 118 is disposed radially outside of outer surface 124 of rotor carrier 108.

Stator assembly 104 is disposed radially outside of the rotor assembly 102 and is fixed to module housing 136. Stator assembly 104 includes stator carrier 140 and stator segment 142. In one embodiment, stator segment 142 may be a stack of stator segments. Stator carrier 140 includes: axially extending portion 144, radially extending portion 146 extending radially inward toward axis of rotation AR from a first end of axially extending portion 144, and radially extending portion 148 extending radially away from axis of rotation AR from a second, opposite end of axially extending portion 144. Axially extending portion 144 of stator carrier 140 includes inner surface 150. Stator segment 142 is installed and arranged on inner surface 150. In one embodiment, stator segment 142 may be installed on stator carrier 140 via a shrink fit arrangement. That is, stator carrier 140 is heated to expand inner surface 150, stator segment 142 is installed on stator carrier 140, and inner surface 150 shrink fits to stator segment 142 after stator carrier 140 cools. Radially extending portion 146 of stator carrier 140 extends radially inward of rotor assembly 102 toward torque converter assembly 106 and axis of rotation AR. That is, radially extending portion 146 extends away from stator segment 142 and rotor segment 112 in a radially inward direction toward axis of rotation AR. Radially extending portion 146 extends around stator end windings 152 and radially inward of rotor carrier 108. Stator carrier 140 is further arranged to fix stator assembly 104 to module housing 136. That is, radially extending portion 148 of stator carrier 140 includes opening 147 defined therein for receiving connector 149 to fix stator carrier 140 to module housing 136. In example embodiments, connector 149 may be a bolt or other type of fastener.

Hybrid module 100 further includes torque converter assembly 106 fully disposed radially inside rotor assembly 102. Torque converter assembly 106 includes: impeller 154 having impeller shell 156 fixed to rotor carrier 108 with at least one blade attached thereto, turbine 158 having turbine shell 160 with at least one blade attached thereto; stator 162 having at least one blade attached thereto; and lock-up clutch 164. Impeller shell 156 may be fixed to radially extending portion 122 of rotor carrier 108 via welded connection 166. Impeller shell 156 and rotor carrier 108 together form a housing for torque converter assembly 106. Torque converter assembly 106 and disconnect clutch 130 may be disposed radially inside rotor carrier 108. That is, disconnect clutch 130, lock-up clutch 164, turbine 158, turbine shell 160, stator 162, impeller 154 and impeller shell 156 may be completely disposed radially inside rotor carrier 108. Stated another way, disconnect clutch 130, lock-up clutch 164, turbine 158, turbine shell 160, stator 162, impeller 154 and impeller shell 156 may together extend an axial length equal to or less than that of an axial length of the rotor carrier. In embodiments, rotor carrier 108 may include an internal diameter between 141-201 mm and a torus size between 135-195 mm.

Lock-up clutch 164 may be disposed on a first axial side of rotor flange 110 and disconnect clutch 130 may be disposed on a second opposite side of rotor flange 110. Lock-up clutch 164 may further include: piston plate 170 disposed between rotor flange 110 and turbine shell 160; reaction plate 172 fixed to axially extending portion 120 of rotor carrier 108 and disposed between piston plate 170 and turbine shell 160; a first plurality of clutch plates 174 connected to rotor carrier 108; and a second plurality of clutch plates 176 connected to inner disk carrier or support flange 178, wherein the first and second plurality of clutch plates 174, 176 are disposed axially between piston plate 170 and reaction plate 172. Piston plate 170 may further be sealed to rotor flange 110 and output hub 180. inner disk carrier or support flange 178 may be sealed to reaction plate 172 at a radially outer end and connected to turbine shell 160 and output hub 180 at a radially inner end, for example via a riveted connection.

Resolver assembly 182 is provided for measuring the speed and angular position of rotor 112 and includes: resolver stator 184 fixed to stator carrier 140 and resolver rotor 186 mounted on resolver rotor hub or flange 188. Flange 188 may be fixed to impeller shell 156 and extend axially away from impeller shell 156 in axial direction AD1 that is opposite axial direction AD2. In one embodiment, impeller shell 156 and flange 188 may be a single-piece, integral construction, for example. In another embodiment, flange 188 and impeller shell 156 may be a multi-piece construction and may be fixed together via a welded connection, for example. Flange 188 extends axially beyond rotor carrier 108 and resolver rotor 186 may be press-fit on an outer surface of flange 188. However, it is to be understood that resolver rotor 186 may be fixed to flange 188 via other methods, for example, staking.

Resolver stator 184 may be fixed to radially extending portion 146 of stator carrier 140. In one embodiment, resolver stator 184 is fixed to radially extending portion 146 of stator carrier 140 by connector 190, which may be a bolt, for example. However, it is to be understood that other fixing methods (e.g., riveting, staking, adhesives) may be employed in other embodiments (not shown). Resolver stator 184 is disposed radially inward of rotor carrier 108. That is, a radial distance of resolver stator 184 measured from axis of rotation AR is less than a radial distance of rotor carrier 108 measured from axis of rotation AR. Resolver rotor 186 is axially aligned with resolver stator 184. That is, a line can be drawn normal to axis of rotation AR that extends or passes through both resolver stator 184 and resolver rotor 186. Resolver rotor 186 is disposed radially inward of resolver stator 184 and rotor carrier 108.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 hybrid module
102 rotor assembly
104 stator assembly
106 torque converter assembly
108 rotor carrier
110 rotor carrier hub or rotor flange
112 rotor segment
114 spring end plate
116 spring end plate
118 end ring
120 axially extending portion
122 radially extending portion
124 outer surface
126 radial surface
128 disconnect clutch cover
130 disconnect clutch
132 opening
134 bolts
136 module housing
140 stator carrier
142 stator segment
144 axially extending portion
146 radially extending portion
147 opening
148 radially extending portion
149 connector
150 inner surface
152 stator end windings
154 impeller
156 impeller shell
158 turbine
160 turbine shell
162 stator
164 lock-up clutch
166 connection
170 piston plate
172 reaction plate
174 first plurality of clutch plates
176 second plurality of clutch plates
178 inner disk carrier or support flange
180 output hub
182 resolver assembly
184 resolver stator
186 resolver rotor
188 resolver rotor hub or flange
190 connector

What is claimed is:

1. A hybrid module, comprising:
a rotor assembly including a rotor carrier having an axially extending section, a rotor flange attached to an inner surface of the axially extending section of the rotor carrier, and a rotor mounted on an outer surface of the axially extending section of the rotor carrier; and
a torque converter completely disposed radially inside of the rotor carrier and including an impeller having an impeller shell fixed to the rotor carrier such that the impeller shell and the rotor carrier form a housing of the torque converter, wherein the torque converter includes a lock-up clutch comprising a piston plate sealed to the rotor flange and a reaction plate fixed to the rotor carrier.

2. The hybrid module according to claim 1, wherein the rotor flange extends radially inward toward an axis of rotation, the rotor flange being arranged to connect to an input shaft.

3. The hybrid module according to claim 1, further comprising a disconnect clutch disposed on a first axial side of the rotor flange, wherein the lock-up clutch is disposed on a second, opposite axial side of the rotor flange.

4. The hybrid module according to claim 3, wherein the disconnect clutch, the lock-up clutch, a turbine, and the impeller are disposed radially inside the rotor carrier.

5. The hybrid module according to claim 4, wherein the disconnect clutch, the lock-up clutch, the turbine, and the impeller together extend a first axial length equal to or less than a second axial length of the rotor carrier.

6. The hybrid module according to claim 5, wherein:
the rotor carrier includes a radially extending portion extending radially outward from the axially extending portion; and
the impeller shell is fixed to an inner end of the radially extending portion.

7. The hybrid module according to claim 6, wherein the impeller shell is fixed to the inner end of the radially extending portion of the rotor carrier via a welded connection.

8. The hybrid module according to claim 1, further comprising:
a flange attached to a blade supporting portion of the impeller shell and extending axially outward therefrom, wherein the flan e is formed integrally with the impeller shell as a single piece; and
a resolver assembly including a resolver rotor mounted on an outer surface of the flange.

9. The hybrid module according to claim 8, wherein the resolver rotor is press-fit on the outer surface of the flange.

10. The hybrid module according to claim 8, wherein the flange extends axially beyond the rotor carrier.

11. A hybrid module, comprising:
a rotor assembly including a rotor carrier;
a torque converter assembly disposed radially inside of the rotor carrier and including an impeller having an impeller shell fixed to the rotor carrier such that the impeller shell and the rotor carrier form a housing of the torque converter;
a flange directly attached to a blade supporting portion of the impeller shell and extending axially outward therefrom, wherein the flange is formed integrally with the impeller shell as a single piece; and
a resolver assembly including a resolver rotor mounted on an outer surface of the flange.

12. The hybrid module according to claim 11, wherein the rotor carrier and the impeller shell are fixed together via a welded connection.

13. The hybrid module according to claim 11, wherein the resolver rotor is press-fit onto the flange.

14. The hybrid module according to claim 11, further comprising a stator assembly including a stator carrier and a resolver stator of the resolver assembly is attached to the stator carrier.

15. The hybrid module according to claim 11, wherein the rotor assembly includes a rotor flange attached to the rotor carrier and extending radially inward toward an axis of rotation, wherein the rotor flange is arranged to connect to an input shaft.

16. The hybrid module according to claim 15, further comprising a disconnect clutch disposed on a first axial side of the rotor flange and a lock-up clutch disposed on a second axial side of the rotor flange.

17. The hybrid module according to claim 16, wherein the disconnect clutch, the lock-up clutch, a turbine, and the impeller are disposed radially inside the rotor carrier.

18. The hybrid module according to claim 16, wherein the lock-up clutch includes a piston plate sealed to the rotor flange and a reaction plate fixed to the rotor carrier.

19. The hybrid module according to claim 18, wherein the lock-up clutch includes a first plurality of clutch plates and a second plurality of clutch plates disposed axially between the piston plate and the reaction plate, wherein the first plurality of clutch plates are attached to the rotor carrier.

20. A torque converter for a hybrid module, comprising:
a torus including a turbine and an impeller having an impeller shell fixed to a rotor carrier, wherein the impeller shell and the rotor carrier form a housing of the torque converter; and
a lock-up clutch disposed within the housing and axially aligned with the torus, wherein the lock-up clutch and the torus together extend a first axial distance equal to or less than a second axial distance the rotor carrier extends such that the lock-up clutch and the torus are fully disposed radially inside the rotor carrier, wherein the lock-up clutch includes a piston plate sealed to a rotor flange and a reaction plate fixed to the rotor carrier, the rotor flange being attached to the rotor carrier and extending radially inward toward an axis of rotation.

* * * * *